United States Patent [19]
Burkley et al.

[11] Patent Number: 5,580,033
[45] Date of Patent: Dec. 3, 1996

[54] BELLOWS TYPE AIR SPRING AND METHOD OF MAKING SAME

[75] Inventors: Thomas E. Burkley, Akron; Robert C. Schisler, Munroe Falls; Gary J. Thompson, Akron, all of Ohio

[73] Assignee: The Goodyear Tire & Rubber Company, Akron, Ohio

[21] Appl. No.: 418,984

[22] Filed: Apr. 7, 1995

[51] Int. Cl.⁶ .................................................. F16F 9/04
[52] U.S. Cl. ..................... 267/64.27; 267/122; 264/258; 264/271.1
[58] Field of Search ................................. 267/122, 153, 267/64.27, 64.19, 64.23, 292; 264/258, 271.1; 156/184, 187, 245

[56] References Cited

U.S. PATENT DOCUMENTS 2,874,458  10/1955  Smith.
5,382,006   1/1995  Arnold ............................ 267/64.27

FOREIGN PATENT DOCUMENTS 582823  10/1958  Italy ..................................... 267/64.27
 74333   3/1989  Japan ................................... 267/64.27

*Primary Examiner*—Lee W. Young
*Attorney, Agent, or Firm*—Marc R. Dion, Sr.; Paul E. Milliken

[57] ABSTRACT

A bellows type air spring having a circular lobed body member with an inner an outer rubberized fabric reinforcing ply and a bead ring at each end. The turn up portion at each end of the fabric layers is wrapped around the bead ring with the turn up portion of the inner ply extending axially inwardly from the bead ring a substantial distance beyond the end of the turn up portion of the outer ply on both ends of the spring to provide longer flex life and prevent premature cracking of the body member in the areas of the end bead rings. The manufacturing method involves the use of an inner fabric ply that is substantially longer in the axial direction than the outer ply instead of using both inner plies of the same axial length.

16 Claims, 3 Drawing Sheets

5,580,033

BELLOWS TYPE AIR SPRING AND METHOD OF MAKING SAME

FIELD OF INVENTION

This invention relates to fluid springs, such as pneumatic or air springs, of the type used in fluid suspension systems for vehicles and other applications and a method for making such springs. More specifically this invention relates to bellows type air springs having one or more annular radially outwardly projecting lobes.

BACKGROUND OF THE INVENTION

Bellows type air springs have been known in the prior art for many years. A typical example of a bellows type air spring and a method of making such spring is shown in U.S. Pat. No. 2,874,458 issued to R. D. Smith. A bellows type air spring is made by first forming on a drum a cylindrical body having usually two plies of uncured bias ply rubberized fabric, an inner and outer cover of rubber or other elastomeric material, and an end bead ring of metal cable or filaments on each end with the ends of the fabric layers wrapped around each respective end bead ring. The cylindrical body or carcass is formed and the bead rings applied with the rubber in the green or uncured state. The uncured carcass is then placed in a mold for shaping and curing by heat and pressure to a finished shape of a bellows having one or more radially outwardly protruding lobes. If the particular design of bellows spring has more than one lobe, "girdle-ring" beads of substantially similar construction to the bead rings applied on each end are applied at one more locations along the axial length of the body depending upon the number of lobes. A girdle-ring is positioned encircling the outer face of the outer cover at an axial location between each of the lobes. When the bellows air spring is performing its function of a cushioning operation with internal gas or liquid pressure in the body of the spring, the girdle-rings, in cooperation with the end bead rings, retain the smallest diameter portions of the spring while allowing each lobe to bulge radially outwardly at an axial mid-point of each lobe.

One of the constant problems encountered with prior bellows spring devices has been a tendency of early cracking in the bead turn up area. When this cracking appears, it normally encircles the outer cover layer a short distance axially inwardly from the bead, i.e. in the "bead turn up area" near the end edges of the turned up fabric layers. This cracking is a major cause of customer dissatisfaction. The present invention changes the relative overlap relationship of the inner and outer fabric reinforcement layers in a manner which remedies the problem of early cracking in the bead turn up area and substantially increases the flex life of the bellows style air springs.

OBJECTS OF THE INVENTION

An object of this invention is to provide a bellows type air spring with extended flex life.

Another object of the invention is to provide a bellows type air spring of such a design that there is a substantial reduction in cracking of the layers of the body in the bead turn up area.

Still another object of this invention is to provide a longer life bellows type air spring by a simple design change in the relative overlap relationship of the reinforcement layers which can be performed on existing building and molding equipment.

These and other objects of the invention will become more fully apparent in the following specification and the attached drawings.

SUMMARY OF THE INVENTION

This invention is a bellows type fluid spring comprising a continuous circular flexible body member having a circular bead portion containing a bead ring at each end and at least one annular lobe portion located between the bead portions and adjacent to at least one of the bead portions, each said lobe portion extending radially outwardly and progressively increasing from a smallest diameter portion to a largest diameter portion, the body member comprising a radially inner fabric ply and a radially outer fabric ply coextensive therewith and adhesively bonded thereto, both plies of the body member having a ply turn up portion at each end of the body portion wrapped around the bead ring on a respective end of the body member, the outer ply turnup portion being adhesively attached to a radially outer face of the outer ply for a first distance from the end bead ring, the inner ply turnup portion extending beyond an end edge of the outer ply turnup for a second distance from the bead ring which is substantially greater than the first distance but less than the distance between the bead ring and the largest diameter portion of the adjacent lobe, and the inner ply turnup portion overlapping and being adhesively secured to a radially outer face of the outer ply turnup and a portion of the radially outer face of the outer ply extending beyond the end edge of the outer ply turnup.

DESCRIPTION OF THE PREFERRED EMBODIMENTS

Figure 1:
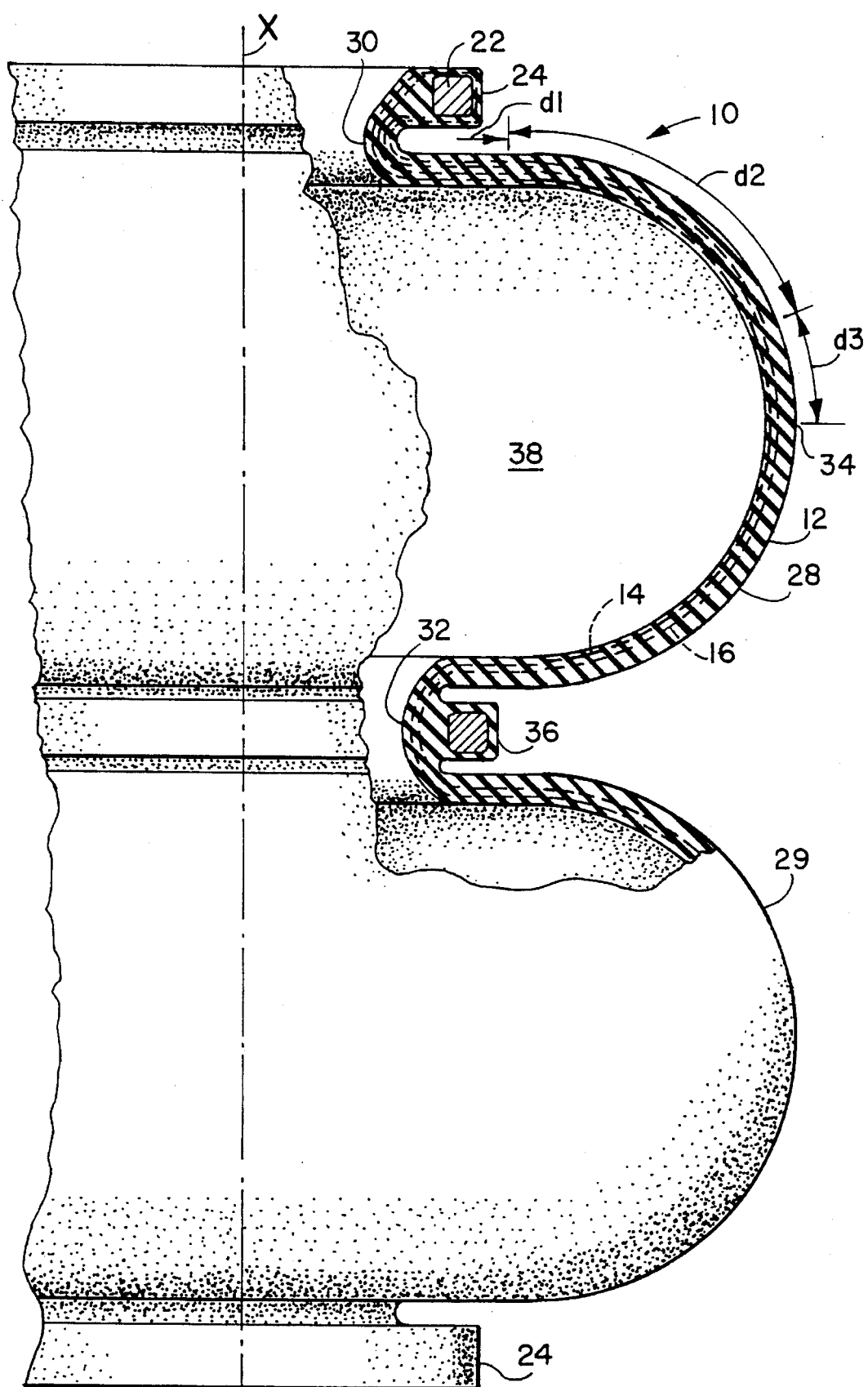
FIG. 1 is a fragmentary side elevational view of a bellows type spring of the invention with portions broken away to show the wall structure and the bead rings.

FIG. 1 shows a bellows type air spring 10 which is a typical example of the type of spring using the present invention. The spring 10 also shown in greater detail in FIG. 2 has a circular flexible body member 12 formed from a radially inner ply 14 and a radially outer ply 16 of rubberized fabric material. Both the plies 14 and 16 are preferably made of bias ply fabric with the bias in one of the plies being inclined at an opposite angle to the bias in the other ply. In some spring configurations additional reinforcement plies can be used between the inner and outer ply. The body member 10 surrounds a longitudinal X axis as shown in FIG. 1. An end bead ring 22 is located on each end of the body 12 in an end bead portion 24 which forms an annular rib-like shape for attachment of the ends of the spring to a rigid mounting structure such as the flange ring 26 shown in FIG. 2. The bead ring 22 can be formed from multiple parallel filaments such as steel or other material, or can be in the form of a cable structure.

The air spring 10 shown in FIG. 1 is a multiple lobed air spring 10 having lobes 28 and 29 which protrude radially outwardly from small diameter portions 30 and 32 to a largest diameter portion 34.

In a multiple lobed air spring such as the two lobed spring shown in FIG. 1, a girdle bead ring 36 encircles the outside face of the body 12. The girdle bead ring 36 is frequently made from a plurality of parallel filaments or wires, however, other ring constructions can be used for the girdle ring just as in the case of the end bead rings. This girdle ring 36 retains the small diameter portion 32 and prevents it from expanding radially outwardly when the body member 12 is subjected to internal pressure. Likewise the end bead rings 22 retain the small diameter portions 30. The lobe portions 38 and 29 can expand radially outwardly away from the X axis when subjected to internal pressure. In an air spring containing more than two lobes additional girdle bead rings are located between each adjacent pair of lobes. In a single lobe air spring, no girdle bead rings are needed.

When the spring 10 is clamped in working position in its location of intended use, the spring with the structure to which it is attached form a sealed chamber 38.

In order to overcome premature cracking problems in the body member 10 in the area of turn up of the ends of the reinforcing plies 14 and 16 around the end bead rings 22, the structure of this invention contains a changed design in the overlapping relationship between the ends of the inner ply 14 and the outer ply 16.

Figure 3:
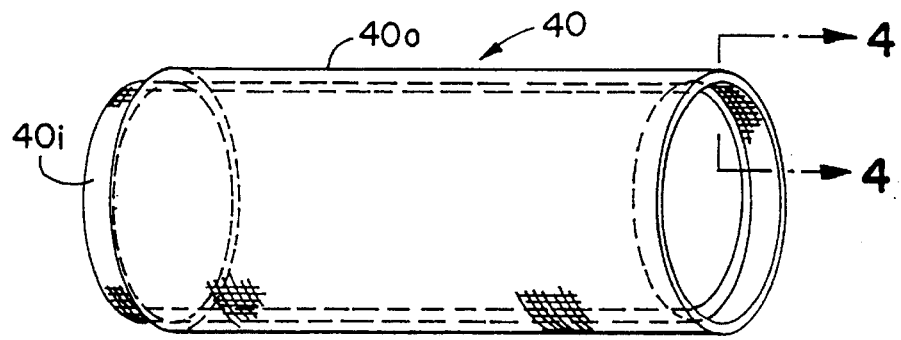
FIG. 3 is a simplified oblique view of a partially built uncured carcass of a prior art bellows air spring showing the relative length and position of fabric reinforcing layers when positioned on a building drum.
Figure 4:
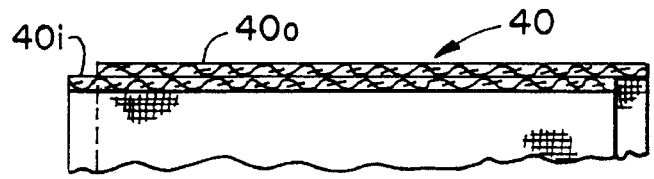
FIG. 4 is a fragmentary cross-sectional view taken on line 4—4 of FIG. 3.
Figure 5:
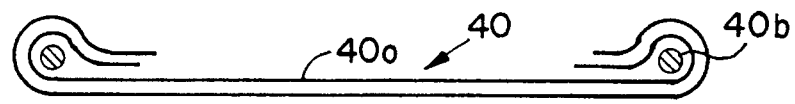
FIG. 5 is a simplified diagrammatic view showing the overlapping relationship of the ends of the fabric layers of FIG. 4 after they have been wrapped around the end bead rings.

FIG. 3 shows a prior art carcass 40 of an air spring being formed on a conventional building drum (not shown) in which an inner fabric ply 40i and an outer fabric ply 40o are of identical length but are offset in the axial direction for a very short distance. This means that on one end the inner ply 40i projects a short distance beyond the outer ply 40o and on the opposite end, the outer ply 40o projects and short distance beyond the inner ply 40i. FIG. 4 also illustrates the offset arrangement of the plies 40i and 40o. It can then be seen in FIG. 5 that when the plies 40i and 40o are folded around end beads 40b, that on the left end the turn up portion of the inner ply 40i extends for a short distance beyond the turn up portion of the outer ply 40o. On the right end however, the turn up portion of the inner ply 40i terminates a short distance from the end of the turn up portion of the outer ply 40o. Air springs built having this prior art construction have had problems with premature cracking of the body member in the turn up portion near the bead ring.

Figure 3A:
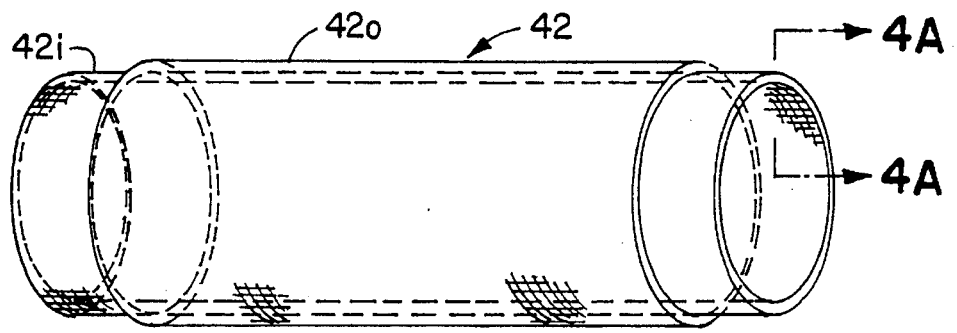
FIG. 3A is a view similar to FIG. 3 but showing the relative length and position of fabric reinforcing layers of the present invention when positioned on a building drum.
Figure 4A:
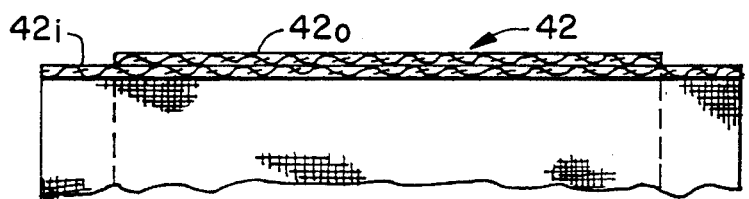
FIG. 4A is a fragmentary cross-sectional view taken on line 4A—4A of FIG. 3A.
Figure 5A:
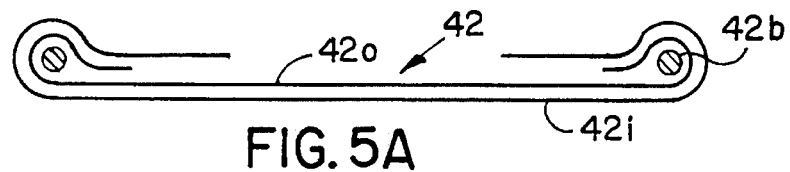
FIG. 5A is a simplified diagrammatic view showing the overlapping relationship of the ends of the fabric layers of FIG. 4A after they have been wrapped around the end bead rings.

In contrast to the prior art structure of FIG. 3, FIG. 3A shows a carcass 42 being formed on a drum (not shown) in which the inner fabric ply 42i is substantially longer in axial length than the outer fabric ply 42o. This is further shown in FIG. 4A. This structure results in the configuration shown in FIG. 5A when the ends of the plies 42i and 42o are folded around end beads 42b in which on both ends of the carcass 42, the inner ply 42i extends for a substantial distance beyond the end of the turn up portion of the inner ply 42i. This modified structure results in a substantial increase in flex life of the body of bellows type air springs.

Figure 2:
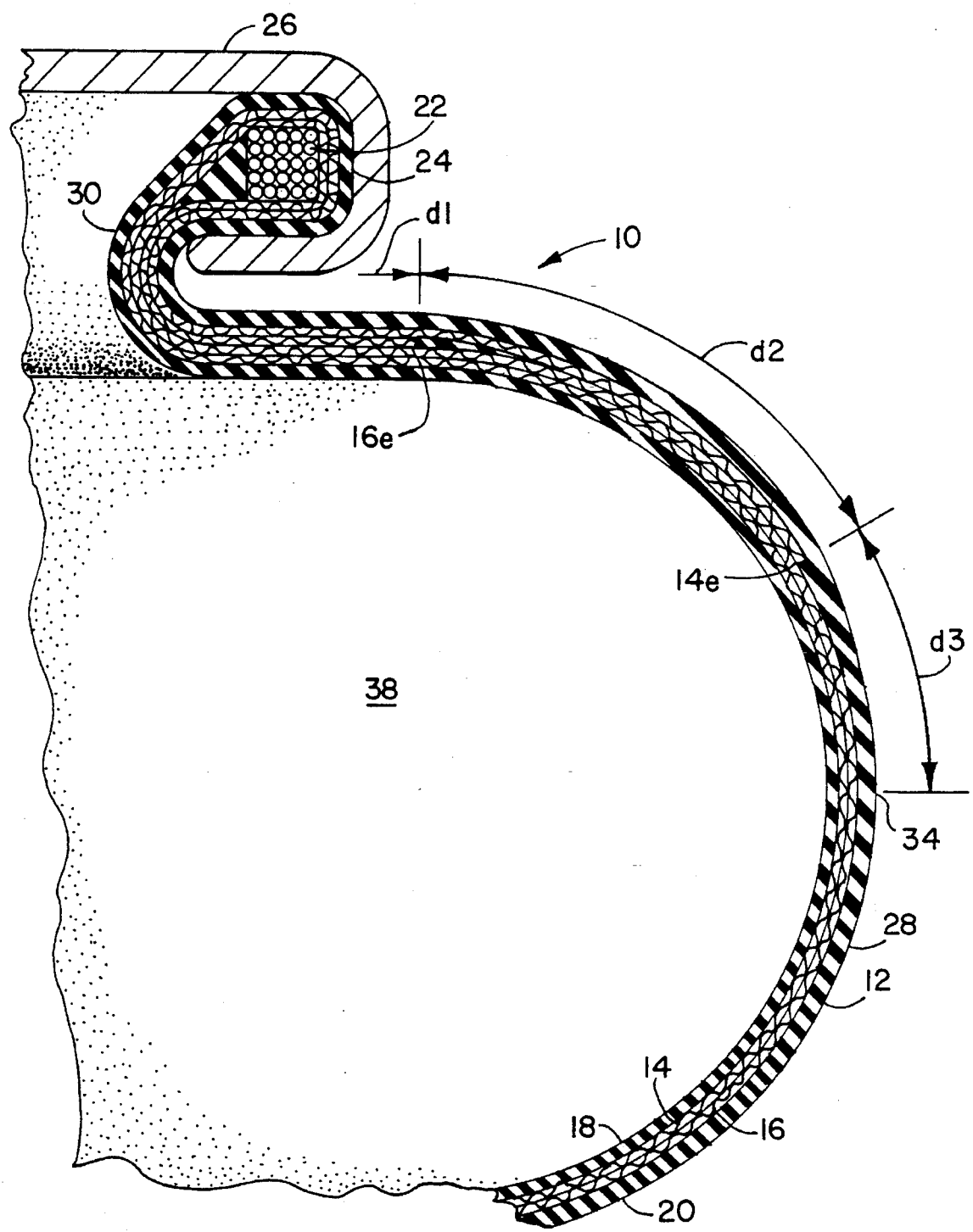
FIG. 2 is an enlarged fragmentary view of a portion of the spring shown in FIG. 1, showing in greater detail the turn up area around the end bead ring and the relationship of the fabric reinforcing layers.

Referring more specifically to FIG. 2, both the inner fabric ply 14 and the outer fabric ply 16 are wrapped around the end bead ring 22 and are adhered to an outer surface of one or more of the fabric layers. This wrapped portion is referred to as the "turn up" portion of the ply.

The outer ply 16 when wrapped around the bead ring 22 is adhered to its own outer face and extends for a distance d1 from the bead ring 22. The inner ply 14 is wrapped around the bead ring 22 and extends for a substantially further distance d2 beyond an end edge 16e of the outer ply 16, but terminates at an end edge 14e at a spaced distance d3 from the largest diameter location 34 on the lobe 28.

While the relative proportion of the distances d1, d2, and d3 can vary it has been found that a substantial overlap distance d2 for the ply 14 beyond the end edge 16e of the outer ply 16 is desirable and that the distance d3 between the end edge 14e and the largest diameter location 34 is preferably about one half the distance of d2. The distance d1 should be at least 1 inch and the distance d2 should be greater than d1 and in many instances would be approximately 2 times the length d1. In one size of air spring the length of d2 may be 2 inches and the length of d3 may be 1 inch.

The structural modification in the turn up area of air springs as shown in this invention can apply to various designs of bellows type air springs regardless of the number of lobes and the number of reinforcing plies and regardless of the type of bead rings.

Other modifications can be made in the embodiments shown herein without departing from the scope of the invention.

We claim:

1. A bellows type fluid spring for sealing attachment at each end to a bead retaining structure to form a fluid retaining chamber, the spring comprising:

a continuous circular flexible body member having a circular bead portion containing a bead ring at each end and at least one annular lobe portion located between the bead portions and adjacent to at least one of the bead portions, each said lobe portion extending radially outwardly and progressively increasing from a smallest diameter portion to a largest diameter portion, the body member comprising a radially inner fabric ply and a radially outer fabric ply coextensive therewith and adhesively bonded thereto, both plies of the body member having a ply turn up portion, at each end of the body portion, wrapped around the bead ring on a respective end of the body member, the outer ply turn up portion being adhesively attached to a radially outer face of the outer ply for a first distance from the end bead ring, an end edge of the inner ply turn up portion extending beyond an end edge of the outer ply turn up portion for a second distance from the bead ring which is substantially greater than the first distance but less than the distance between the bead ring and the largest diameter portion of the adjacent lobe, and the inner ply turn up portion overlapping and being adhesively secured to a radially outer face of the outer ply turn up and a portion of the radially outer face of the outer ply extending beyond the end edge of the outer ply turn up.

2. A bellows type fluid spring as claimed in claim 1 including a plurality of lobe portions and a girdle-ring bead surrounding an outer face of the body member and positioned between each adjacent pair of lobe portions at the smallest diameter portion thereof.

3. A bellows type fluid spring as claimed in claim 1 including a layer of elastomeric material covering both a radially inner and a radially outer face of the body member.

4. A bellows type fluid spring as claimed in claim 1 wherein the distance between the end edge of the inner ply turn up portion and the largest diameter portion of the adjacent lobe portion is approximately one half the distance which the inner ply turn up extends beyond the end edge of the outer ply turn up.

5. A bellows type fluid spring as claimed in claim 1 wherein the distance between the end edge of the inner ply turn up portion and the end edge of the outer ply turn up portion, is greater than the distance between the end edge of the outer ply turn up portion and the adjacent end bead ring.

6. A bellows type air spring for sealing attachment at each end to a bead retaining flange structure to form an air retaining chamber, the spring comprising:

a continuous circular flexible body member surrounding a longitudinal axis and being of varying diameter throughout its length, said body member having a circular bead portion at each end defining an end opening, and at least one curved lobe portion located between the bead portions and adjacent to at least one of the bead portions, each said lobe portion extending radially outwardly and progressively increasing from a smallest diameter portion to a largest diameter portion, the body member comprising a radially inner fabric ply and a radially outer fabric ply coextensive therewith and adhesively bonded thereto, an end bead ring located in the bead portion on each end of the body member, both plies of the body member having a ply turnup portion at each end of the body portion wrapped around the end bead ring on a respective end of the body member, the outer ply turnup portion being adhesively attached to a radially outer face of the outer ply for a first distance from the end bead ring, the inner ply turnup portion extending beyond an end edge of the outer ply turnup for a second distance from the bead ring which is greater than the first distance but less than the distance between the bead ring and the largest diameter portion of the adjacent lobe, and an end edge of the inner ply turnup portion overlapping and being adhesively secured to a radially outer face of the outer ply turnup portion and a portion of the radially outer face of the outer ply extending beyond the end edge of the outer ply turnup.

7. A bellows type air spring as claimed in claim 6 inluding a plurality of lobe portions and a girdle-ring bead surrounding an outer face of the body member and positioned between each adjacent pair of lobe portions at the smallest diameter portion thereof.

8. A bellows type air spring as claimed in claim 6 including a layer of elastomeric material covering both a radially inner and a radially outer face of the body member.

9. A bellows type air spring as claimed in claim 6 wherein the distance between an end edge of the inner ply turnup and the 1 diameter portion of the adjacent lobe portion is approximately one half the distance which the inner ply turnup extends beyond the end edge of the outer ply turnup.

10. A bellows type fluid spring as claimed in claim 6 wherein the distance between the end edge of the inner ply turn up portion and the end edge of the outer ply turn up portion, is greater than the distance between the end edge of the outer ply turn up portion and the adjacent end bead ring.

11. A bellows type fluid spring as claimed in claim 6 wherein the outer ply turn up portion extends at least 1 inch beyond an adjacent end bead ring.

12. A bellows type air spring as claimed in claim 6 including additional plies of fabric material located between the radially inner ply and the radially outer ply.

13. A method of making a bellows type fluid spring comprising the steps of:

forming on a cylindrical drum, a sheet of uncured elastomeric material into a cylindrical shaped inner cover layer which is open on each end;

applying an inner ply of uncured rubberized fabric to the outer surface of the elastomeric layer, both the axial ends of the inner fabric ply being aligned with the axial ends of the elastomeric inner cover layer;

applying an outer ply of uncured rubberized fabric to the outer surface of the inner ply of fabric, said outer fabric ply being of substantially shorter axial length than the inner fabric ply and being longitudinally centered with respect to the inner fabric ply so that the inner fabric ply extends a substantial distance beyond each end the outer fabric ply;

applying a sheet of uncured elastomeric material to the outer surface of the outer fabric ply to form an outer cover layer;

positioning bead rings surrounding the fabric plies and cover layers near each end thereof;

folding the ends of the fabric plies and the cover layers around the bead rings with the wrapped around end portions of the inner fabric ply overlapping and extending axially inwardly for a substantial distance beyond the edge of the wrapped around end portions of the outer fabric ply;

removing the assembled layers and plies from the drum;

placing the assembled layer and plies in a forming and curing mold; and applying heat and pressure to the assembled layers and plies to form and cure the spring in the desired finished shape.

14. The method claimed in claim 13 including the step of positioning on the assembled layers and plies at least one girdle bead ring surrounding the outer cover layer to form a multi-lobed spring.

15. The method claimed in claim 14 including the step of positioning a girdle member axially between each adjacent pair of lobes.

16. The method claimed in claim 13 wherein during the forming and curing step the assembled layers and plies are formed into a circular body having at least one lobe portion having a smallest and a largest diameter portion and the end edge of the folded over portion of the longest fabric ply terminates at a spaced distance from the largest diameter portion of the lobe portion.

* * * * *